Patented May 9, 1933

1,908,398

UNITED STATES PATENT OFFICE

RUDOLF BEYTHEIN, OF NEURUPPIN/MARK, GERMANY, ASSIGNOR TO PYRENE-MINIMAX CORPORATION, A CORPORATION OF DELAWARE

FIRE EXTINGUISHING METHOD

No Drawing. Application filed April 1, 1931, Serial No. 527,043, and in Germany August 21, 1930.

This invention relates to the production of fire extinguishing foam and has for a primary object the development of a method which will effect an economy in the space required by and in the weight of the materials stored and will overcome the difficulties heretofore encountered in the way of deterioration of the materials in the course of storage. The invention also has reference to the provision of an improved form of foam producing compound or mixture in the nature of a dry powder capable of making a tough and durable foam.

It is now the common practice in the development of fire extinguishing foam to bring together two substances which will react with water at ordinary temperatures to develop gases and to provide in addition some suitable foam stabilizer so as to produce a relatively tough and stable foam upon the development of the gases. For this purpose substances such as carbonates and bicarbonates capable of giving off carbon dioxide under suitable conditions are mixed with certain acids or sour salts and some foam stabilizer and these substances are all brought together in the presence of water when the foam is to be produced. In some instances the two principal ingredients are maintained separately in solution with the foam stabilizer in one of them while in other instances the ingredients are maintained either separately or in one mixture in a dry, powdered state. The latter method has the advantage of saving in the amount of storage space required and in minimizing the weight of the materials, which becomes important when they must be transported, as for example on shipboard. Where the ingredients are stored together, it is necessary to guard against the contact of moisture as well as against excessive heat. In the course of storage for a relatively long period prior to use and particularly when subjected to comparatively high temperatures, as in the compartments on shipboard, the mixture has a tendency to form into lumps and thus become less accessible to the water and less efficient in the production of foam. To prevent the premature reaction of the ingredients of the mixture as far as possible, it is necessary to produce them by means of a slow and costly process.

According to the present invention, the foam-forming materials are maintained in a dry, powdered state and they are of such a nature that they are not harmfully affected by storage for a considerable period of time even at comparatively high temperatures. In lieu of using a mixture of three ingredients as in the prior methods referred to above, it is contemplated that only a bicarbonate, or a mixture of a bicarbonate and a foam stabilizing substance, shall be used. The release of carbon dioxide and the production of foam is effected through the use of warm water or other fluids maintained at approximately 80° C., or even higher temperatures. The bicarbonates of the alkalis and also of ammonium have a tendency to dissociate in water and other suitable solutions, such as glycerine, and if the temperature exceeds 70° C., the decomposition takes place very rapidly. According to the present method a stream of warm water or glycol water or the like, around a temperature of 80° C., may be brought into contact with a mixture of potassium, sodium or ammonium bicarbonate or the like with any suitable foam stabilizer and due to the reaction brought about by the heated water, the bicarbonate will be broken down into the corresponding carbonate, carbon dioxide or carbonic acid, and water. Thus heat applied to potassium bicarbonate will produce the following reaction:

$$2KHCO_3 = K_2CO_3 + CO_2 + H_2O$$

Similarly, heat will break down sodium bicarbonate and ammonium bicarbonate as follows:

$$2NaHCO_3 = Na_2CO_3 + CO_2 + H_2O$$
$$2NH_4HCO_3 = (NH_4)_2CO_3 + CO_2 + H_2O$$

The carbonic acid released by the heat will produce a foam of very fine bubbles having walls consisting of a carbonate solution.

It will be observed from the foregoing equations that only half of the $CO_3$ radical is converted into carbonic acid as the result of the application of the hot water whereas in the present processes which employ an additional ingredient, such as an acid or a sour salt, as for example aluminum sulfate, all of the $CO_3$ radical of the bicarbonate is converted into carbonic acid. This would lead to the conclusion that only half as much of the foam producing carbonic acid is developed by the new method from a given quantity of a bicarbonate as by the older methods. However, it is to be borne in mind that in the older methods it is necessary to add a greater quantity of the acid or sour salt ingredient than the bicarbonate employed so that the total bulk and weight of material necessary to produce a given quantity of foam is greater under the older methods than under the new method now proposed. For example, by the use of hot water in connection with sodium bicarbonate 22 grammes of carbonic acid gas may be produced from 84 grammes of the salt. On the other hand 44 grammes of carbonic acid gas may be produced from 84 grammes of sodium bicarbonate mixed with 111 grammes of commercial aluminum sulfate. In the latter case then 195 grammes of material are required to produce 44 grammes of the carbonic acid gas which could be produced by the new method from 168 grammes of material. Thus a considerable saving in weight is obtained by the use of the sodium bicarbonate alone through the application of hot water. This is important particularly for installations on board of ships where it is desirable to reduce as far as possible the extra burden to be carried.

It may be considered objectionable under some conditions to be compelled to provide hot water in lieu of water at ordinary temperatures for the reaction. However, under many circumstances in which installations of fire extinguishing equipment are made, hot water of the character required by the present method is readily available and in sufficient quantities. On board a ship, for example, and in conjunction with boiler rooms and the like in general, plenty of hot water is always available. It is in connection with this type of installation, furthermore, that the temperature conditions harmful to the ordinary foam-forming mixtures are particularly encountered.

Another advantage of the new method is that it results in the production of an exclusively alkaline carbonate which will not tend to produce rust spots on iron with which it may come in contact. This is of considerable importance in connection with installations on shipboard and for power plants and the like. The production of sodium sulfate by the prior methods is objectionable under many conditions and this is completely eliminated by the present method.

As foam stabilizers many suitable substances may be employed, as for example saponin and lye of cellulose. Albumin may also be used in conjunction with the present method in addition to other forms of foam stabilizers. The hot water will serve to coagulate the albumin and a tough, durable foam will be produced.

There is thus provided in accordance with the present invention a method whereby a stable, tough and durable foam may be produced at a point of generation from a mixture of a bicarbonate with a foam stabilizer and this foam may be transmitted for use in the extinguishment of fires of all sorts. The elimination of the acid or sour salt ingredient has not only provided a more stable mixture for storage over a long period and under the maximum temperature conditions normally encountered but has reduced the weight of material required for the production of a given quantity of foam and has overcome the detrimental effect of the ordinary products upon iron and steel structures with which they come in contact.

While various specific substances and conditions have been mentioned in the foregoing description, it is to be understood that these have been specified merely as illustrative of a suitable application of the principles of the invention and that many variations may be made without departing from the general spirit and scope of the invention.

What I claim is:

1. A method of generating fire extinguishing foam which comprises maintaining a mixture of a bicarbonate and a foam stabilizer and bringing hot water at a temperature above 60° C. into contact with said mixture to generate foam.

2. A method of generating fire extinguishing foam which comprises bringing hot water into contact with a mixture consisting of a foam stabilizer and an ingredient which will liberate carbonic acid gas upon the application of such hot water, the temperature of the water being high enough to liberate the gas in sufficient quantities to produce with the stabilizer a fire extinguishing foam.

3. A method of generating fire extinguishing foam which comprises bringing water at a temperature above 70° C. into contact with a substance containing an alkaline bicarbonate, the hot water alone acting upon the bicarbonate to release a foam producing gas.

4. A method of generating fire extinguishing foam which comprises bringing water at a temperature above 70° C. into contact with a mixture consisting of an alkaline bicarbonate and a foam stabilizer.

5. A method of generating fire extinguishing foam which comprises bringing hot water at a temperature higher than the prevailing atmospheric temperature into contact with a mixture containing a foam stabilizer including albumin and an ingredient which will liberate carbonic acid gas upon the application of such hot water.

6. A method of generating fire extinguishing foam which comprises bringing water at a temperature above 70° C. into contact with a substance containing an alkaline bicarbonate and including a substance tending to coagulate at the temperature of said water.

7. A method of generating fire extinguishing foam which comprises bringing a hot liquid at a temperature above 60° C. into contact with a mixture consisting of a foam stabilizer and a substance adapted to produce a foam-forming gas upon application of said hot liquid thereto.

8. A method of generating fire extinguishing foam which comprises bringing a liquid at a temperature above 70° C. into contact with a mixture of a substance adapted to produce a foam-forming gas upon application of said hot liquid thereto and a foam stabilizer including a substance tending to coagulate upon the application of said hot liquid.

9. A method of producing a fire extinguishing foam which comprises subjecting a dry powder consisting of foam stabilizing ingredients and an alkaline bicarbonate to the action of a hot fluid which is at a temperature high enough to liberate foam producing gas directly from said bicarbonate.

10. A method of producing a fire extinguishing foam which comprises bringing together hot water and a dry powder containing a foam stabilizer and an ingredient which will liberate a foam-forming gas upon the application of hot water, the water being provided at a temperature high enough to liberate said foam forming gas directly from said bicarbonate.

In testimony whereof, I have signed my name to this specification this 13th day of March 1931.

RUDOLF BEYTHIEN.